(12) United States Patent
Welle et al.

(10) Patent No.: US 10,337,903 B2
(45) Date of Patent: Jul. 2, 2019

(54) MEASUREMENT DEVICE CONTROL SYSTEM FOR DETERMINING A TOPOLOGY OF A SURFACE OF A BULK MATERIAL

(71) Applicant: VEGA Grieshaber KG, Wolfach (DE)

(72) Inventors: Roland Welle, Hausach (DE); Josef Fehrenbach, Haslach (DE)

(73) Assignee: VEGA GRIESHABER KG, Wolfach (DE)

( * ) Notice: Subject to any disclaimer, the term of this patent is extended or adjusted under 35 U.S.C. 154(b) by 607 days.

(21) Appl. No.: 14/781,225

(22) PCT Filed: May 8, 2014

(86) PCT No.: PCT/EP2014/059465
§ 371 (c)(1),
(2) Date: Sep. 29, 2015

(87) PCT Pub. No.: WO2014/184089
PCT Pub. Date: Nov. 20, 2014

(65) Prior Publication Data
US 2016/0054167 A1 Feb. 25, 2016

(30) Foreign Application Priority Data

May 17, 2013 (EP) .................................... 13168360

(51) Int. Cl.
*G01S 13/42* (2006.01)
*G01S 13/88* (2006.01)
*G01F 23/284* (2006.01)

(52) U.S. Cl.
CPC ............ *G01F 23/284* (2013.01); *G01S 13/42* (2013.01); *G01S 13/88* (2013.01)

(58) Field of Classification Search
CPC ........ G01F 23/284; G01S 13/42; G01S 13/88; G01R 33/583; G05B 19/0428; B65C 9/1865; C21B 7/24
USPC .......................................................... 342/124
See application file for complete search history.

(56) References Cited

U.S. PATENT DOCUMENTS

| | | | |
|---|---|---|---|
| 4,219,814 A * | 8/1980 | Johnson | C21B 7/24 266/86 |
| 6,986,294 B2 | 1/2006 | Fromme et al. | |
| 7,064,546 B2 * | 6/2006 | Feiweier | G01R 33/583 324/307 |
| 8,332,182 B2 | 12/2012 | Fehrenbach et al. | |

(Continued)

FOREIGN PATENT DOCUMENTS

| | | | |
|---|---|---|---|
| DE | 3 735 905 | 5/1989 | |
| DE | 3735905 A1 * | 5/1989 | ............... G01F 1/00 |

(Continued)

*Primary Examiner* — Peter M Bythrow
*Assistant Examiner* — Nuzhat Pervin
(74) *Attorney, Agent, or Firm* — Fay Kaplun & Marcin, LLP (57) ABSTRACT

For determining the topology of a bulk material surface, a series of echo curves are detected in different primary radiation directions of the antenna. In the process, the primary radiation direction of the antenna is changed in such a way that all of the generated echo curves of the series of echo curves can be used for determining the topology of the bulk material surface. As a result, the measurement time can be reduced.

11 Claims, 7 Drawing Sheets

(56) References Cited

U.S. PATENT DOCUMENTS

| | | |
|---|---|---|
| 8,488,110 B2 | 7/2013 | Hug et al. |
| 2003/0151543 A1 | 8/2003 | Nakanishi et al. |
| 2004/0164737 A1* | 8/2004 | Feiweier .............. G01R 33/583 324/309 |
| 2005/0013254 A1* | 1/2005 | Kuroda .............. G05B 19/0428 370/241 |
| 2006/0170543 A1* | 8/2006 | A. Schaffer .......... G01F 23/284 340/521 |
| 2010/0019952 A1 | 1/2010 | Poussin |
| 2010/0070208 A1 | 3/2010 | Sai |
| 2010/0182190 A1 | 7/2010 | Spanke et al. |
| 2010/0223019 A1 | 9/2010 | Griessbaum et al. |
| 2011/0018689 A1* | 1/2011 | McAllister ............ B65C 9/1865 340/10.1 |
| 2011/0109496 A1 | 5/2011 | Van Den Berg |
| 2012/0212365 A1* | 8/2012 | Feil ........................ G01S 13/42 342/107 |
| 2012/0221261 A1 | 8/2012 | Fehrenbach et al. |
| 2013/0060528 A1 | 3/2013 | Portman |

FOREIGN PATENT DOCUMENTS

| | | | |
|---|---|---|---|
| DE | 43 39 441 | 5/1995 | |
| DE | 10106176 | 8/2002 | |
| DE | 10 2004 041 857 | 3/2006 | |
| DE | 102004041857 A1 * | 3/2006 | ............ G01F 23/284 |
| DE | 10 2011 075 826 | 11/2012 | |
| DE | 102011075826 A1 * | 11/2012 | ............ G01F 23/284 |
| EP | 2 090 387 | 8/2009 | |
| EP | 2090387 A1 * | 8/2009 | ............ B22D 11/041 |
| EP | 2 128 576 | 12/2009 | |
| EP | 2 315 045 | 4/2011 | |
| FR | 2 907 546 | 4/2008 | |
| FR | 2907546 B1 * | 1/2009 | ............ B01J 8/0015 |
| TW | I269884 | 1/2007 | |
| WO | 2010/003656 | 1/2010 | |

* cited by examiner

MEASUREMENT DEVICE CONTROL SYSTEM FOR DETERMINING A TOPOLOGY OF A SURFACE OF A BULK MATERIAL

REFERENCE TO RELATED APPLICATIONS

This application is a National Phase Application of PCT Patent Application Serial No. PCT/EP2014/059465 filed on May 8, 2014 which claims the benefit of the tiling date of EP Patent Application Serial No. 13 168 360.9 filed on 17 May 2013, the disclosure of which is hereby incorporated herein by reference.

FIELD OF THE INVENTION

The invention relates to level measurement. In particular, the invention relates to a measurement device for determining the topology of a surface of a bulk material stored in a container, to the use of a measurement device for determining a volume flow of a bulk material, to the use of a measurement device for determining the mass of a bulk material, to a method for determining the topology of a surface of a bulk material, to a program element and to a computer-readable medium.

TECHNICAL BACKGROUND

Bulk materials which are stored in a container or located on a conveyor belt generally have an irregular, uneven surface. In particular, a bulk peak or a hollow trough may be formed when the container is filled or emptied.

In this situation, level measurement devices often determine the level inaccurately if merely the distance from a single point on the filling material surface is determined.

SUMMARY OF THE INVENTION

An object of the invention is to reduce the time for determining the topology of a bulk material surface.

This object is achieved by the features of the independent claims. Developments of the invention may be taken from the remaining claims and from the following description.

A first aspect of the invention specifies a measurement device for determining the topology of a surface of a bulk material stored in a container, which device comprises an antenna arrangement, an echo curve generating unit and a positioning device.

The antenna arrangement is for emitting a transmission signal in a primary radiation direction of the antenna arrangement and for receiving the transmission signal reflected at least on a surface of the bulk material. The transmission signal reflected and received by the antenna arrangement may also be referred to as a reception signal.

The echo curve generating unit is configured for generating an echo curve from the transmission signal which is reflected and received by the antenna arrangement. In this context, the echo curve mirrors, i.e. corresponds to, the signal strength or amplitude of the reflected transmission signal over a distance measurement range of the measurement device. In other words, the echo curve images the dependency of the amplitude of the received, reflected transmission signal on the path length covered by the corresponding signal portion from the emission of the transmission signal to the reception thereof by the antenna.

An echo curve of this type generally has a maximum (peak) which originates from the reflection of the transmission signal on the filling material surface. There may also be further maxima in the echo curve, which originate from reflections on interference points in the container or other reflectors.

The measurement device or part of the measurement device or at least the antenna thereof is controllable by means of the positioning device, in such a way that the primary radiation direction of the antenna arrangement can be changed by means of the positioning device, in such a way that a series of echo curves can be generated in different primary radiation directions. In particular, a single, mechanical or electronically "pivotable" antenna may be provided. In the case of mechanical pivoting of the antenna, no antenna array is required.

Pivoting the antenna may bring about a change in the primary radiation direction of the transmission signals generated by the measurement device. In the present context, the pivoting of the antenna may also be implemented by an arrangement which consists of at least one radiation unit (for example a horn antenna) and at least one deflection element located on the radiation path of the transmission signal (for example a metal plate or a mirror or another reflector) for changing the propagation direction of the transmission signal.

The topology of the bulk material surface can be determined by means of an evaluation unit. In this context, the "topology" of the bulk material surface or of the bulk material means the surface profile, in other words the surface progression of the bulk material surface. The surface progression can be determined along a line by one-dimensional scanning over the surface (the determined surface profile in this case being a planar, vertical section through the surface of the bulk material), or by two-dimensional scanning over the surface, as opposed to the aforementioned one-dimensional scanning over the surface. In this case, the topology of the bulk material surface is thus being determined in three dimensions.

So as now to determine the topology of the bulk material surface in two dimensions or in three dimensions, the evaluation unit may for example be configured to carry out the following steps:

Initially, a first distance cell is established, which is a particular distance interval in the echo curve, i.e. a section of the echo curve. In the next step, in each echo curve of the series of echo curves this distance cell is analysed, making it possible to determine the echo curve which has the greatest signal strength by comparison with the remaining echo curves within the first distance cell. Since each echo curve has been received in a particular primary radiation direction, each echo curve can be identified unambiguously by the orientation of the primary radiation direction. The value and optionally the precise position of the greatest signal strength in the distance cell are also determined.

In the following, the coordinates of a measurement point of this type mean the angle characterising the primary radiation direction at which the corresponding echo curve was generated and the position (the "location") of the greatest signal strength in the echo curve. The value of the signal strength means the amplitude of the echo curve at the location of the greatest signal strength. This "location" is equivalent to the distance corresponding to the greatest signal strength.

The above-disclosed steps may subsequently be carried out for further distance cells of the echo curves.

It is thus possible to subdivide the echo curves into a plurality of distance cells placed in series, or at least to subdivide a particular portion of the echo curves into a plurality of distance cells for which the above-disclosed steps are carried out.

In other words, a plurality of echo curves are each received at a different angle (in other words at a different primary radiation direction of the antenna arrangement). The primary radiation direction of the antenna arrangement can be provided mechanically by suitably adjusting the antenna arrangement and/or a reflector which reflects the transmission signal on the path thereof from the antenna to the bulk material surface. It is also possible to adjust the primary radiation direction electronically, for example by providing a correspondingly controlled antenna array.

After the series of echo curves is received, the first distance cell of the echo curves is defined, and subsequently, for each echo curve, the maximum of the echo curve in this distance cell is determined. Next, it is determined which maximum of the various echo curves is the greatest maximum, and the coordinates thereof are determined. These steps are subsequently carried out for further distance cells. Depending on whether the primary radiation direction of the antenna is changed in one direction or two directions in space, a section line or a three-dimensional representation of the bulk material surface can be calculated from this.

The evaluation unit may be configured to determine the level of a bulk material located in a container and/or the volume of the bulk material using the data obtained in the above-disclosed steps.

The topology of the bulk material surface may naturally also be determined by carrying out different methods.

In one aspect of the invention, the positioning device comprises a control system which is configured to change the primary radiation direction of the antenna arrangement in such a way that as large a proportion as possible of the generated echo curves of the series of echo curves can be used for determining the topology.

In other words, the control system is configured to ensure that merely the areas of the bulk material surface which are actually necessary and desirable for determining the topology are scanned over by the antenna arrangement (in that the primary radiation direction is deflected onto these areas). For example, the control system may prevent the primary radiation direction of the antenna arrangement from circumventing the bulk material surface.

Overall, this means that the number of measurement curves sampled in a measurement cycle for determining the bulk material surface can be greatly reduced. This can lead to more rapid determination of the bulk material surface topology and thus of the fill level of bulk materials which are stored in a container or of the mass flow of a bulk material on a conveyor belt, which involves as little measurement time as possible.

If for example at an expedient minimum resolution of the topology to be determined the primary radiation direction in both spatial directions varies over a range of 180 degrees, the number of echo curves to be sampled for this purpose is over 30000 (assuming a grid of 1 degree steps).

Assuming that two curves are detected per second, as is often provided when a 4-20 mA current loop is used for measurement value transmission without a power supply to the measurement device, the sampling of all measurement curves required for determining the topology would take over 15,000 seconds.

If the measurement time required for this is now to be reduced, the power supply of the measurement device could for example be increased. In this case, however, a 4-20 mA measurement loop would not be able to supply sufficient power.

According to the invention, however, (at least for the most part) only those echo curves which are actually to be used for determining the topology are detected. In other words, no echo curves are detected which the measurement device assumes are not suitable for determining the topology, since it can be assumed with a high degree of certainty that these echo curves cannot contribute to determining the topology, for example because the associated primary radiation direction circumvents the bulk material surface.

As a result, the number of echo curves to be sampled can be greatly reduced.

For example, the control system for changing the primary radiation direction of the antenna arrangement is configured in such a way that all of the primary radiation directions set by the positioning device are within a three-dimensional space which does not touch or intersect the container wall (or only does so slightly) above a fill level most recently determined in the container by the measurement device. In other words, the different primary radiation directions which are set are always directed towards the filling material surface and do not go past it.

In a further embodiment of the invention, the control system is configured to take into account the geometry of the container in which the bulk material is stored when changing the primary radiation direction of the antenna arrangement.

For example, the base face of the body or the three-dimensional space spanned by the different primary radiation directions which are to be set is adapted to the base face of the container. In a container having a round base face, the positioning device scans over a round face, and in a container having a square cross-section, a square face is scanned over.

In a further embodiment of the invention, the control system is configured to change the primary radiation direction of the antenna arrangement exclusively within an angular range defining a sub-region of the bulk material surface.

In other words, scanning does not take place over the entire bulk material surface.

In a further embodiment of the invention, the control system is configured to move the primary radiation direction along a spiral path.

In a further embodiment of the invention, the control system is configured to set the angle difference between two primary radiation directions of the antenna arrangement which are used for generating two successive echo curves as a function of the fill level most recently determined by the measurement device.

Thus, for example, the angle difference between the two primary radiation directions may be greater if the fill level is high, and accordingly smaller when the fill level is low, so as to achieve the desired resolution in each case.

In a further embodiment of the invention, the control system is configured to set the angle difference between two primary radiation directions of the antenna arrangement, which are used for generating two successive echo curves, as a function of a local topology of the bulk material surface.

For example, it may be provided that the angle difference between the two primary radiation directions is smallest where the topology of the bulk material surface changes most strongly, for example where the bulk material surface is steepest.

In a further embodiment of the invention, the control system is configured to determine the maximum angle of the primary radiation direction of the antenna arrangement as a function of the fill level most recently determined by the measurement device.

The higher the fill level, the greater this maximum angle is.

In a further embodiment of the invention, the measurement device comprises a 4-20 mA communications interface for connection to a 4-20 mA two-wire line, it being possible to configure the level measurement device to be supplied externally with power merely via the 4-20 mA communications interface. Naturally, an internal power supply in the form of a battery or capacitor may be provided. An external supply of power at another interface may also be possible and provided.

In a further embodiment of the invention, the measurement device comprises an Ethernet communications interface for connection to a local network (local area network, LAN), it being possible for the level measurement device to be configured to be supplied with external power merely via this Ethernet communications interface.

An external supply of power at another interface may also be possible and provided.

The Ethernet and the 4-20 mA communications interface may also be provided simultaneously.

In a further embodiment of the invention, the positioning device is configured to change the primary radiation direction of the antenna arrangement with the assistance of a mechanical adjustment device, by means of which the orientation of the antenna arrangement can be mechanically adjusted.

In a further embodiment of the invention, the positioning device comprises a reflector for changing the primary radiation direction of the antenna arrangement and a mechanical adjustment device for changing the position of the reflector and thus for changing the primary radiation direction of the antenna arrangement.

It may also be provided that both the antenna orientation and the reflector can be adjusted using the positioning device.

In a further embodiment of the invention, the measurement device is configured as a level measurement device. In particular, the measurement device may be configured as a pulsed radar device or an FMCW (frequency-modulated continuous wave) level measurement device.

A further aspect of the invention specifies the use of a measurement device disclosed above and in the following for determining a volume flow of a bulk material which is located on a conveyor belt.

A further aspect of the invention specifies the use of a measurement device disclosed above and in the following for determining the mass of a bulk material.

The knowledge of the topology determined according to the invention is used to determine the mass or the volume flow.

A further aspect of the invention specifies a method for determining the topology of a surface of a bulk material, in which a transmission signal is initially emitted in a primary radiation direction of an antenna arrangement. The signal portion of the transmission signal which is reflected at least on a surface of the bulk material is subsequently received by the antenna arrangement, and an echo curve, which mirrors the signal strength of the reflected transmission signal over a distance measurement range of the measurement device, is generated from the transmission signal which is reflected and received by the antenna arrangement. Subsequently, the primary radiation direction of the antenna arrangement is changed in such a way that a series of echo curves are generated in different primary radiation directions, while minimising the number of generated echo curves in the series of echo curves which cannot be used for determining the topology. Ideally, all of the generated echo curves in the series of echo curves can be used for determining the topology of the surface.

At this point, it should be noted that the features disclosed above and in the following of the measurement device may also be implemented in the method as method steps and vice versa.

A further aspect of the invention specifies a program element which, when executed on the processor of a measurement device, instructs the measurement device to carry out the steps disclosed above and in the following.

A further aspect of the invention specifies a computer-readable medium, on which a program element is stored, which, when executed on a processor of a measurement device, instructs the measurement device to carry out the steps disclosed above and in the following.

The program element may be part of a piece of software which is stored on a processor of the measurement device. The invention also relates to a program element which, by way of an update, instructs an existing program to use to the invention.

It is also considered a central aspect of the invention that the knowledge of the container geometry, and in particular the shape and size of the container cross-section, as well as the current fill level can be taken into account in the selection of the primary radiation directions used for the measurements. The knowledge of the container geometry can be specified by the user, or the measurement device may gain this knowledge via a self-learning mode. Also, the user may input the current fill level of his own accord or the measurement device may measure it in a preliminary measurement.

In the following, embodiments of the invention are described with reference to the drawings.

DETAILED DESCRIPTION OF EMBODIMENTS

The drawings are schematic and not to scale.

In the following description of the drawings, where like reference numerals are used in different drawings they denote like or similar elements. However, like or similar elements may also be denoted by different reference numerals.

The present invention is applied in particular in the field of level measurement devices, but application in the field of object monitoring or mass flow determination is also possible and provided.

Figure 1:
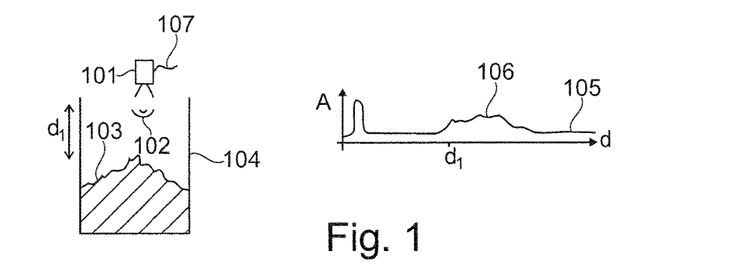
FIG. 1 shows a level measurement device for measuring a level and an echo curve generated by the device.

FIG. 1 shows a level measurement device 101, which generates an image of the reflection properties in the container 104 in the form of an echo curve 105 by emitting a signal 102 towards a filling material surface 103.

The echo curve contains a very wide echo band 106, which is generated by the superposition of a plurality of individual reflections of the bulk material surface 103. By this method, the fill level $d_1$ in the container 104 can be approximately determined and provided externally via a communications interface (107), for example an analogue 4-20 mA interface or a digital interface. A prediction as to the topology of the surface of the bulk material is often only possible to a very limited extent.

Figure 2:
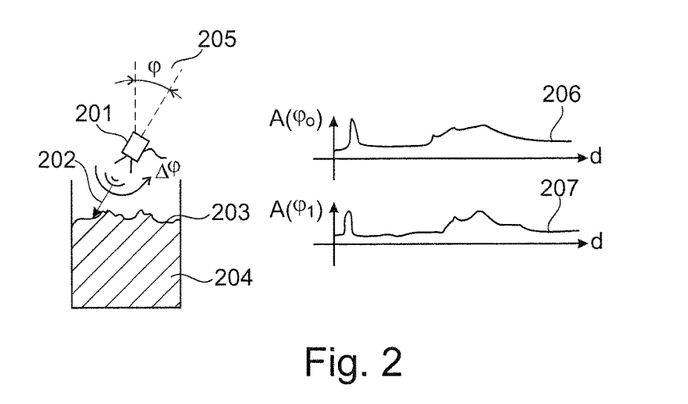
FIG. 2 shows a level measurement device, the primary radiation direction of which can be pivoted, and two echo curves received in different primary radiation directions.

Better results can be determined using a device for detecting the topology of a surface. FIG. 2 shows an arrangement of this type by way of example. The topology-detecting measurement device 201 should be capable, for example by way of rotatable suspension of the device itself or a part of the device (for example the antenna), of changing the primary radiation direction 202 of the measurement device. A change of this type in the primary radiation direction may be implemented for example by using antenna arrays or by using a plurality of antennas. Further, a change of this type in the primary radiation direction of the measurement device may also be achieved by way of further technical measures, for example by pivoting the antenna or the entire measurement device.

By successively changing the primary radiation direction 202, it may be possible to take the measurements of the surface 203 of a medium 204 from various angular directions 205. The detected echo curves 206, 207 illustrate the reflection properties in the respective direction. By way of said curves, it is possible to determine the topology of the surface 203 in the measurement device 201 or a suitable evaluation device.

Figure 10:
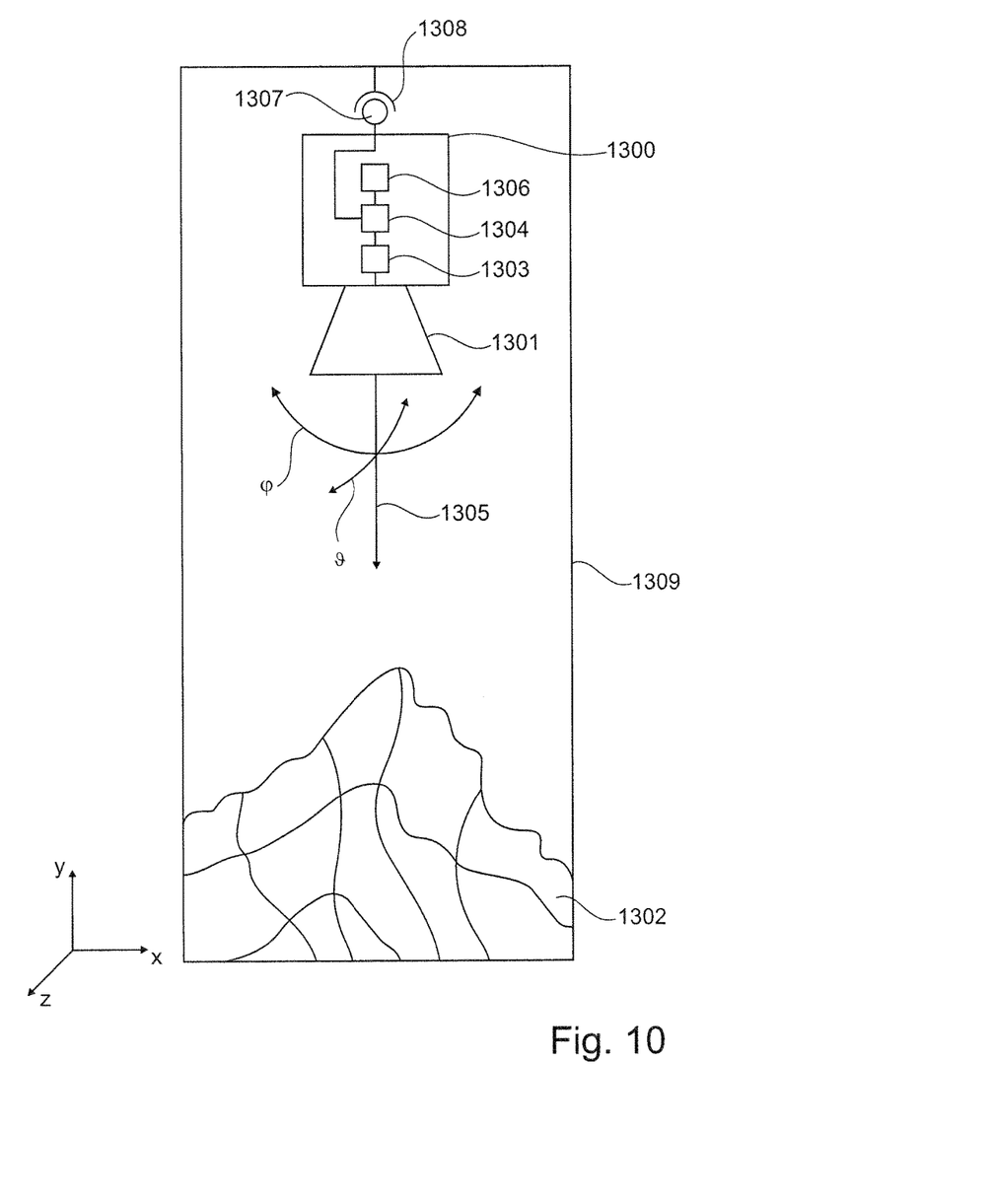
FIG. 10 shows a measurement arrangement in accordance with an embodiment of the invention.
Figure 11:
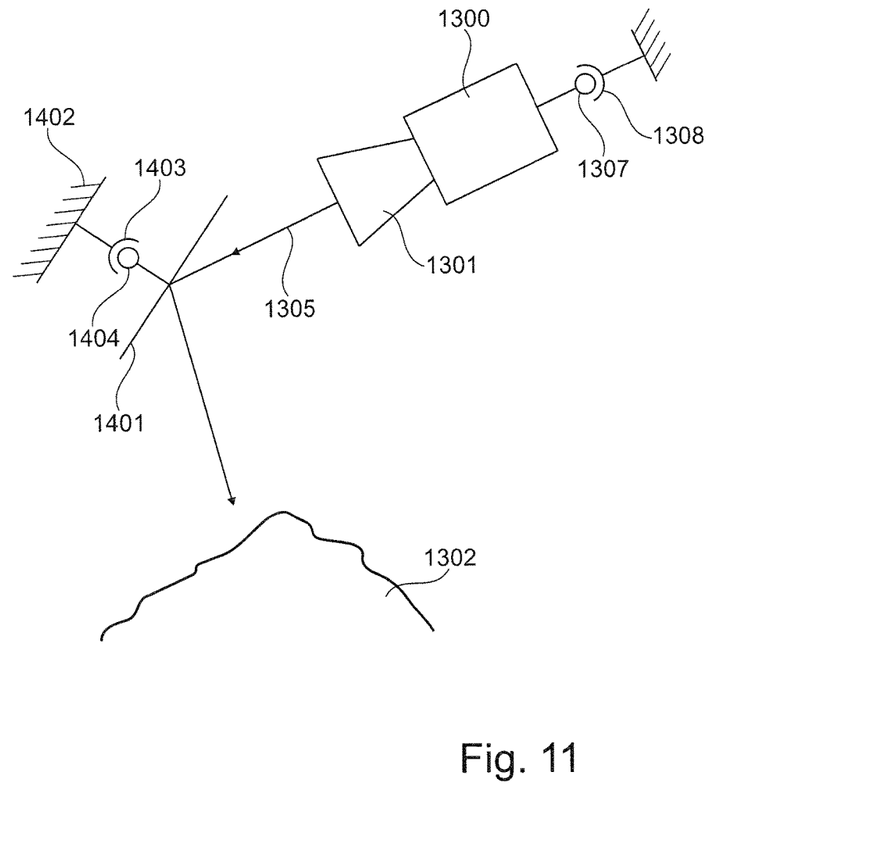
FIG. 11 shows a measurement arrangement in accordance with an embodiment of the invention.

The embodiment of FIG. 2 shows a 2-dimensionally operating measurement device for detecting a topology along a single extension direction of a surface. Moreover, FIGS. 10 and 11 show arrangements which make it possible to detect and determine the topology of the surface in a container in three dimensions by adjusting the primary radiation direction 202 of the measurement arrangement both in an azimuth and in an elevation direction.

The following embodiments of this arrangement are often limited to the two-dimensional case for simple graphic representation. Naturally, the aspects disclosed herein may be used both for the two-dimensional case and for the case of three-dimensional measurement.

Figure 3:
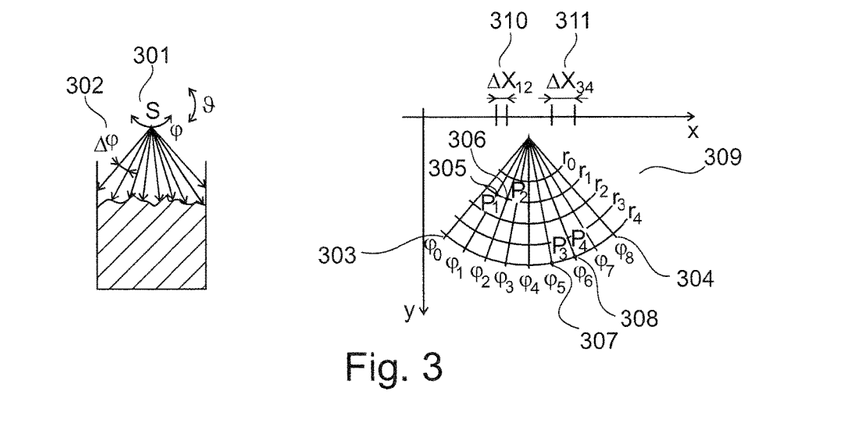
FIG. 3 shows how a topology of a bulk material surface can be determined from individual measurements.

FIG. 3 shows various positions of the primary radiation direction of a topology-detecting measurement device 301. The primary radiation direction is adjusted through a predetermined angle $\Delta\varphi$ 302 after an echo curve 206, 207 is detected. The angular resolution $\Delta\varphi$ corresponds in this case to the maximum angular resolution which can be achieved by the construction of the device. The achievable range of angles between $\varphi_{min}$ 303 and $\varphi_{max}$ 304 is likewise determined by the construction of the device.

On the basis of the detected echo curves 206, 207, the evaluation method determines the position of individual sampling points of the surface in the results matrix 309. Depending on the method, the results matrix may be distinguished by a representation in polar coordinates. However, when converting to Cartesian coordinates, it becomes apparent that the lateral resolution (in other words the resolution in the direction of the X-axis and the direction of the Y-axis) of the method is not equally good in all regions. Thus, for example, in the region of the points P1 305 and P2 306 on a path a $\Delta_{12}$ 310 a very high resolution may be achieved in the X-direction. By contrast, the points P3 307 and P4 308 which are also located by the method are at a distance, projected onto the X-axis, of $\Delta X_{34}$ 311, which is much greater than the distance between the points P1 305 and P2 306.

This means that for practical application of a method of this type the grid spacing $\Delta\varphi$ 302 of the measurement device must be selected very small so as to be able to ensure a predetermined minimum resolution 310 even for the unfavourably positioned points of the results matrix.

On the other hand, this means that a large number of measurements is necessary to detect a surface, and this is accompanied by high requirements on the device for adjusting the primary radiation direction, but also by a high energy requirement for carrying out a plurality of measurements. Further, the time for detecting the surface topology is greatly increased.

Figure 4A:
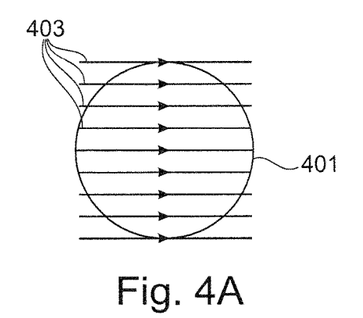
FIGS. 4A to 4E show five examples of paths along which the bulk material surface may be scanned over.

FIGS. 4A to 4E show a first approach for reducing the number of necessary measurements. FIG. 4A is a plan view of a container 401, which for simplicity is initially to be treated as a round container. The primary radiation direction 202 of a measurement device 301 may scan over the container along individual lines 403 in the predetermined imaged grid thereof.

The boundaries of the scan area are generally determined by the physical boundary of the achievable angle ranges between $\varphi_{min}$ 303 and $\varphi_{max}$ 304 or $\vartheta_{min}$ and $\vartheta_{max}$.

Figure 4B:
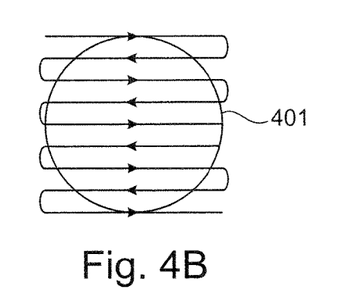

In an alternative configuration, shown in FIG. 4B, a meander-shaped scan 404 may also be carried out. The weakness of both implementations is that the area detected by the primary radiation directions is always larger than the diameter of the container 401, leading to unnecessary measurements. This problem also occurs in an equivalent manner for other container shapes.

Figure 4C:
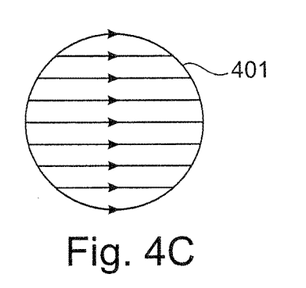
Figure 4D:
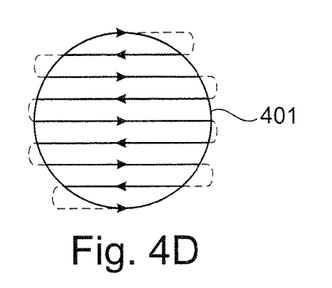

FIGS. 4C and 4D show further embodiments of the method. As can clearly be seen from FIGS. 4C and 4D, measurements are only carried out in the region of interest of the container. This leads to substantially fewer measurements without losses in the topology determination.

Figure 4E:
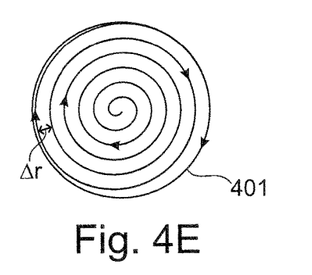

FIG. 4E shows a completely novel approach for round containers, in which the primary radiation direction passes along a spiral with a predeterminable distance $\Delta r$ between the successive spiral segments. For elliptical containers, an elliptical path may naturally be provided.

Figure 5A:
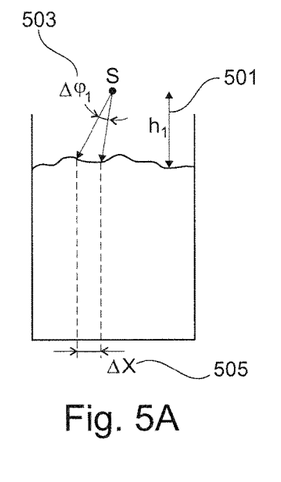
FIGS. 5A and 5B show a further example for avoiding unnecessary measurements.
Figure 5B:
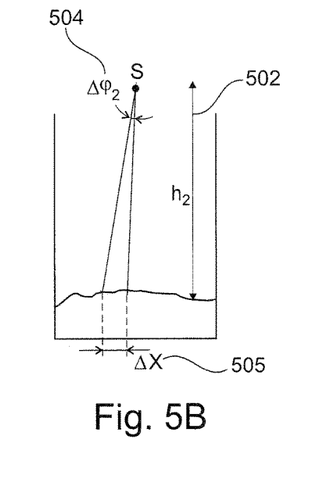

FIGS. 5A and 5B show another approach for avoiding unnecessary measurements. Depending on the height of the current fill level 501, 502, which is known for example from previous measurements, the grid spacing $\Delta\varphi$ of the measurement device can be adapted dynamically. Although the grid spacing $\Delta\varphi_1$ 503 is greater than the grid spacing $\Delta\varphi_2$ 504, the same lateral resolution $\Delta X$ 505 is produced after the evaluation.

Figure 6A:
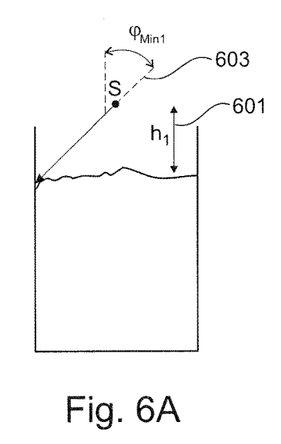
FIGS. 6A and 6B show an example of the delimitation of the maximum angle of the primary radiation direction.
Figure 6B:
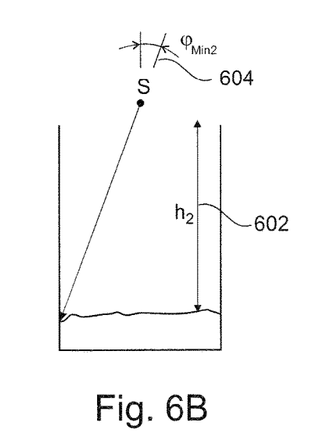

Further, in another embodiment, the number of measurements can be reduced further by limiting the maximum angles $\varphi_{min}$ 303 and $\varphi_{max}$ 304. FIGS. 6A and 6B show a corresponding arrangement. Depending on the height of the current fill level 601, 602, both the minimum angle $\varphi_{min}$ 603, 604 and the maximum angle $\varphi_{max}$ (not shown) can be set dynamically without loss of information.

Figure 7A:
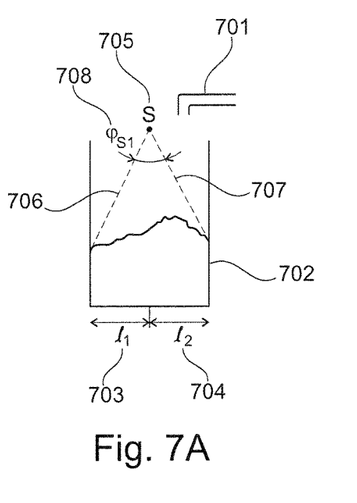
FIGS. 7A and 7B show a further example for reducing the measurement time.
Figure 7B:
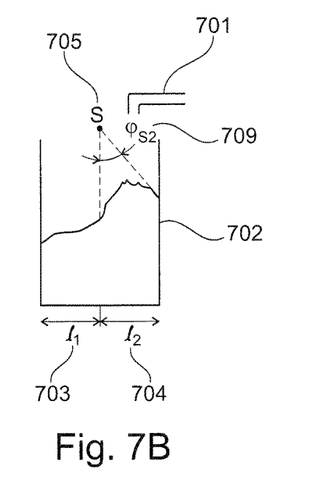

FIG. 7 shows a further option for reducing the measurement algorithm complexity when determining the topology of a surface. The imaged container 702 is filled with the medium using a filling device 701. Since at this point, depending on the construction, it should be taken into account that the surface will change vary rapidly in some regions 704 whilst other regions 703 are instead characterised by slow changes, a mode of operation may be provided in which the measurement device 705 initially measures the entire region 703, 704 of the surface, this being achieved by a suitable selection of $\varphi_{min}$ 303, 706 and $\varphi_{max}$ 304, 707. Specifically, the total measured angle range thus corresponds to $\varphi_{max}-\varphi_{min}=\varphi_{S1}$ 708. Subsequently, the mode of operation is changed in such a way that only the highly dynamic region 704 is measured (see reference numeral 709). The two modes may be alternated by time-multiplexing in any desired manner, so as thus to optimise the complexity of the overall measurement.

Figure 8A:
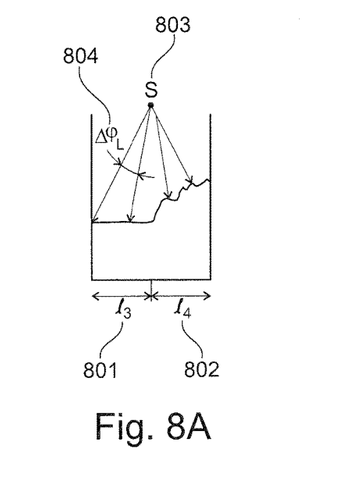
FIGS. 8A and 8B show a further embodiment of a measurement method.
Figure 8B:
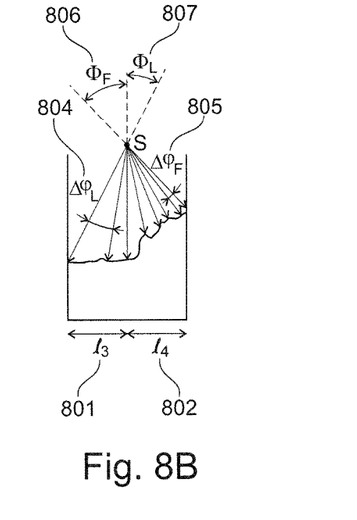

A further embodiment is shown in FIG. 8. In this case, a distinction is made between highly jagged regions 802 and less jagged regions 801. Initially, a mode of operation of the measurement device 803 is provided in which the topology of the surface is determined at a reduced angular resolution 804. Subsequently, in the measurement device 803 a region 801 is identified in which the surface only exhibits slight change. In this region, the missing intermediate values can readily be calculated by interpolation. In the remaining regions 802, 806, the number of measurements is now increased by reducing the angular grid spacing to $\Delta\varphi_F < \Delta\varphi_L$ (804, 805), leading to a better representation of the highly jagged topology.

As a result, the surface topology is detected relatively roughly in the angle range $\phi_F$ at the angular grid spacing $\Delta\varphi_F$, whilst very finely spaced measurement data are detected in the angle range $\phi_L$ at the angular grid spacing $\Delta\varphi_L$. Ultimately, this leads to a major reduction in the complexity required for the overall measurement. In a particular configuration of the method, the regions of rough measurement and the regions of fine measurement are predetermined. However, it may also be possible to have these regions determined dynamically by the device, a single time or continuously, in the manner indicated above or another suitable manner.

It should further be noted that all of the methods and devices presented above are suitable both for two-dimensional measurement along a line and for three-dimensional measurement in the plane.

Figure 9:
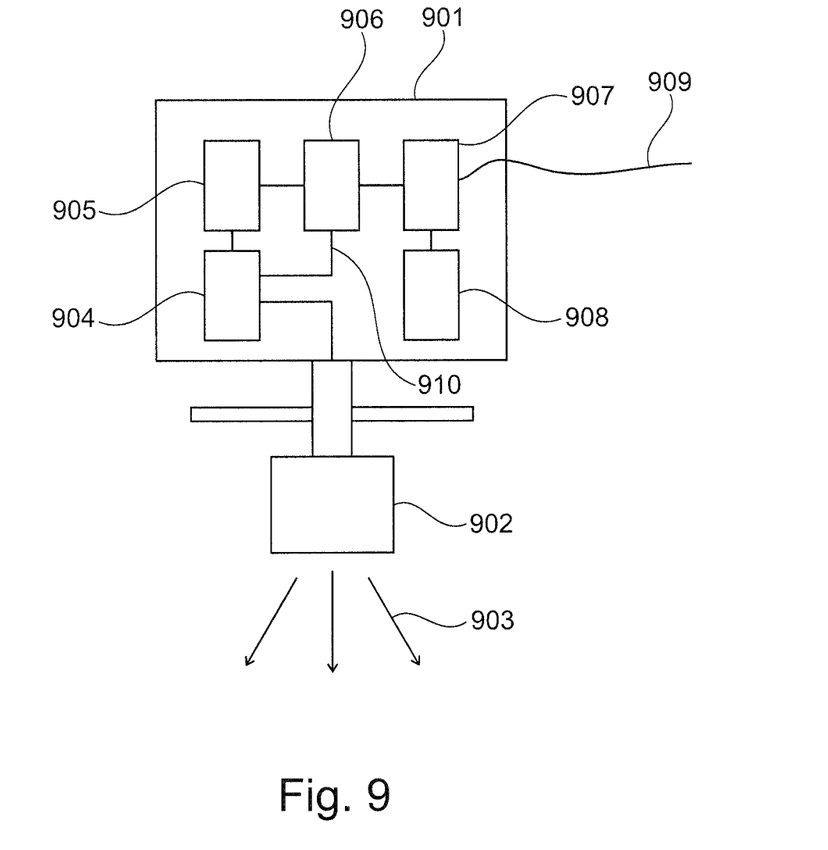
FIG. 9 shows a measurement device in accordance with a further embodiment of the invention.

Further, using the disclosed methods in conjunction with the above-disclosed prior art, it may be possible to minimise the complexity of the measurement in such a way that it is possible to implement a topography-detecting level measurement device using a 4-20 mA interface (loop-powered). FIG. 9 shows a device suitable for this purpose. The measurement device 901 according to the invention comprises a radiation device 902 which is suitable for emitting and receiving a signal generated by a measurement signal unit 904 in predeterminable primary radiation directions 903. The measurement signal unit 904 may be set up to generate and receive measurement signals and also to actuate the radiation device 902. Further, the device 901 comprises a memory unit 905, in which at least two echo curves 206, 207 and/or data extracted therefrom from echoes 106 can be stored, the echo curves 206, 207 imaging the reflection properties in at least two different radiation directions 903.

A signal processing unit 906 may be capable, by using at least two echo curves 206, 207 from at least two radiation directions 903, of determining characteristic data 305, 306 of a topology 309. At least one of the above-proposed methods may be used for this purpose. The device 901 further has a power supply unit 907, which is capable of drawing power from a loop-powered communications interface 909 and supplying it to the remaining parts of the sensor 901. For this purpose, the power supply unit 907 is connected to at least one power storage unit 908, for example a capacitor or a battery.

The signal processing unit 906 may be capable, via a connection 910, of influencing the measurement sequence and the control of the primary radiation direction 903. Further, a sequence of the device may provide that at least one echo curve 206 from a primary radiation direction 903 is detected, and subsequently a pause is inserted in which power for at least one further measurement is collected in the power supply unit 907. When there is enough power, at least one further echo curve 206 may be detected from at least one further primary radiation direction 903. The number of echo curves to be detected may be optimised by the methods presented above, which may run in the signal processing unit 906. Once the topology calculations 309 are complete, the power supply unit 907 may be capable of providing previously defined characteristic values of the topology externally, via a digital interface 909, for example a HART interface. Further, it may be possible to have values derived from the topology, for example the mass of the medium in the container, determined by the signal processing unit 906, and to provide them externally via an analogue interface 909, for example a 4-20 mA interface.

FIG. 10 shows a measurement arrangement in accordance with an embodiment of the invention. A container 1309 is provided in which there is a bulk material 1302. It may also be possible to use the invention in connection with bulk piles without containers. In the upper region of the container there is a level measurement device 1300, which is attached movably to the top region of the container. A positioning device is provided for this purpose, which comprises a ball joint 1307, 1308 which makes it possible to adjust the orientation of the level measurement device along the angles $\varphi$ and $\vartheta$. The positioning device comprises an actuator (not shown), which is connected to the processor 1304 of the level measurement device, in such a way that the primary radiation direction 1305 of the antenna arrangement 1301 of the level measurement device can be set fully automatically.

The reflected transmission signal received by the antenna is passed to the echo curve generation unit 1303, which generates an echo curve therefrom, which is subsequently passed to the processor, in other words the evaluation unit of the level measurement device. The processor 1304 is connected to a memory unit 1306, on which the echo curves and the topology data, from which the topology of the bulk material surface can be calculated, are stored.

FIG. 11 shows a measurement arrangement in accordance with an embodiment of the invention. In this embodiment, a reflector 1401 is provided, which is located in the primary radiation direction 1305 of the antenna arrangement 1301 of the level measurement device and can be adjusted by means of the adjustment device 1403, 1404, which may also be in the form of a ball joint. The stationary part 1403 of the adjustment device is for example connected to the container wall 1402.

Likewise, the level measurement device may also be connected to the container wall via a separate adjustment device 1307, 1308.

For example, it is possible for the level measurement device merely to be pivotable within one plane, and for the mirror to be pivotable in a second plane in such a way that the bulk material surface can be scanned over completely.

According to the invention, the topology of a bulk material surface can be determined using a single antenna. The antenna according to the invention may be selected from the group of horn antennas, rod antennas, patch antennas or any desired array antennas.

By comparing a number of echo curves in a defined region or a defined hollow sphere (distance cell), the lateral resolution of a conventional level measurement device can be further improved, without a plurality of sensors or a plurality of assembly positions being required for this purpose.

For completeness, it should be noted that "comprising" and "having" do not exclude the possibility of other elements or steps, and "an" or "a" does not exclude the possibility of a plurality. It should further be noted that features or steps which have been disclosed with reference to one of the above embodiments may also be used in combination with other features or steps of other above-disclosed embodiments. Reference numerals in the claims should not be treated as limiting.

The invention claimed is:

1. A measurement device for determining a topology of a surface of a bulk material stored in a container, comprising:
    an antenna arrangement emitting a transmission signal in a primary radiation direction of the antenna arrangement and receiving the transmission signal reflected at least on the surface of the bulk material;
    an echo curve generating unit generating an echo curve, which corresponds to the signal strength of the reflected transmission signal over a distance measurement range of the measurement device, from the transmission signal which is reflected and received by the antenna arrangement; and
    a positioning device changing the primary radiation direction of the antenna arrangement, in such a way that a series of echo curves can be generated in different primary radiation directions,
    wherein the positioning device includes a control system which is configured to:
        determine a first topology of the surface of the bulk material, based on a first number of echo curve generations;
        determine a fill level;
        determine a maximum angle of the primary radiation direction of the antenna arrangement with respect to a vertical axis as a function of the fill level; and
        determine a second topology of the surface of the bulk material, based on a reduced second number of echo curve generations, in which the number of echo curves relating to a primary radiation direction of the antenna arrangement above the maximum angle is reduced.

2. The measurement device according to claim 1, wherein the control system is configured in such a way that all of the primary radiation directions set by the positioning device are within a three-dimensional space which does not touch the container wall above a fill level which has most recently been determined in the container by the measurement device.

3. The measurement device according to claim 1, wherein the control system is configured to take into account the geometry of the container in which the bulk material is stored when changing the primary radiation direction of the antenna arrangement.

4. The measurement device according to claim 1, wherein the control system is configured to change the primary radiation direction of the antenna arrangement exclusively within an angular range defining a sub-region of the bulk material surface.

5. The measurement device according to claim 1, wherein the control system is configured to move the primary radiation direction along a spiral path.

6. The measurement device according to claim 1, wherein the control system is configured to set the angle difference between two primary radiation directions of the antenna arrangement which are used for generating two successive echo curves as a function of the fill level most recently determined by the measurement device.

7. The measurement device according to claim 1, wherein the control system is configured to set the angle difference between two primary radiation directions of the antenna arrangement which are used for generating two successive echo curves as a function of a local topology of the bulk material surface.

8. The measurement device according to claim 1, wherein the maximum angle of the primary radiation direction of the antenna arrangement is determined as a function of the fill level most recently determined by the measurement device.

9. The measurement device according to claim 1, further comprising:
    a 4-20 mA communications interface connecting to a 4-20 mA two-wire line
    wherein the level measurement device is configured to be supplied with power merely via the 4-20 mA communications interface.

10. The measurement device according to claim 1, further comprising:
    an Ethernet communications interface connecting to a local network (LAN),
    wherein the level measurement is configured to be supplied with power merely via the Ethernet communications interface.

11. A method for determining a topology of a surface of a bulk material, comprising the steps of:
    emitting a transmission signal using an antenna arrangement in a primary radiation direction of the antenna arrangement;
    receiving a transmission signal which is reflected at least on the surface of the bulk material;
    generating an echo curve, which corresponds to the signal strength of the reflected transmission signal over a distance measurement range of the measurement device, from the transmission signal which is reflected and received by the antenna arrangement;
    determining a first topology of the surface of the bulk material, based on a first number of echo curve generations;
    determining a fill level;
    determining a maximum angle of the primary radiation direction of the antenna arrangement with respect to a vertical axis as a function of the fill level; and
    determining a second topology of the surface of the bulk material, based on a reduced second number of echo curve generations, in which the number of echo curves relating to a primary radiation direction of the antenna arrangement above the maximum angle is reduced.

* * * * *